July 4, 1933.   C. A. CAMPBELL   1,916,299
AIR BRAKE
Filed July 19, 1932    2 Sheets-Sheet 1

Inventor
Charles A. Campbell
Attorneys

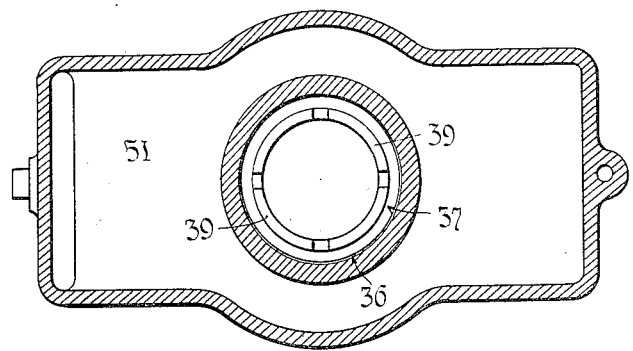
Fig. 3
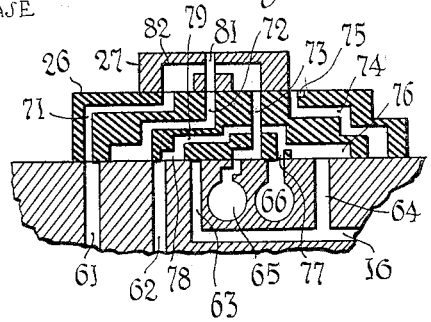
Fig. 4 NORMAL RECHARGE AFTER RETARDED RELEASE
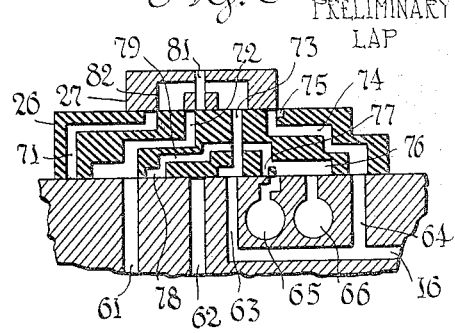
Fig. 6 PRELIMINARY LAP
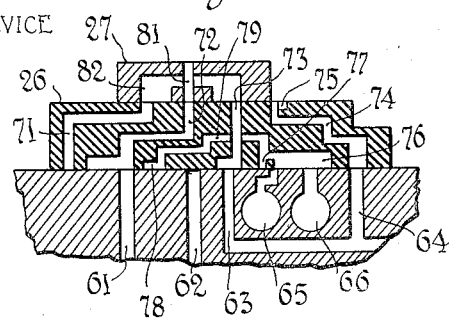
Fig. 5 SERVICE
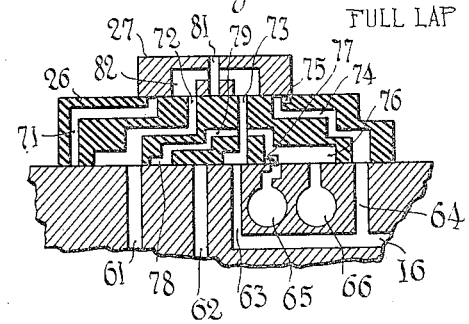
Fig. 7 FULL LAP Patented July 4, 1933

1,916,299

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AIR BRAKE

Application filed July 19, 1932. Serial No. 623,443.

This invention relates to air brakes and particularly to triple valves of the type which produce quick service venting of the brake pipe.

In making split reduction service applications it is desirable in certain classes of service to vent the brake pipe quite markedly on the first reduction, and less markedly on successive reductions. Extremely rapid propagation of the first service reduction of brake pipe ensures prompt initial application of the brakes throughout the train, and is secured by quick service venting. On succeeding reductions it is desirable to vent less air, in order to avoid the development of unduly high brake cylinder pressures.

The present invention secures the desired result by so arranging the quick service venting mechanism that the maximum permissible venting is had on the first reduction, while on succeeding reductions of a split reduction service application, less air is vented. An important characteristic of the invention is that a portion of the air vented in service reductions is usefully applied.

An ancillary feature is the incorporation of means to terminate quite gradually the initial venting flow. Since the first venting flow is considerable in volume and produces a marked and sudden local reduction of brake pipe pressure, its sudden termination would cause undesirable pressure surges in the brake pipe. Gradual or cushioned termination avoids this effect.

Another secondary feature of great practical importance is an arrangement by which the setting of the usual retainers modifies the quick service venting.

While the invention may be incorporated in triple valves, having many special functions, such as stage buildup in service and emergency, feed back in release following emergency, and the like, these functions are not involved in the quick service venting function. Consequently the invention will be disclosed as embodied in a relatively simple triple valve.

In the drawings:

Fig. 1 is a vertical axial section through a triple valve embodying the invention. The parts are shown in normal release position.

Fig. 2 is a section on the line 2—2 of Fig. 1.

Fig. 3 is a section on the line 3—3 of Fig. 1.

Fig. 4 is a fragmentary section similar to a portion of Fig. 1 showing the slide valve with seat and graduating valve in the position of normal recharge after retarded release.

Fig. 5 is a similar view showing service position.

Fig. 6 is a similar view showing preliminary lap position.

Fig. 7 is a similar view showing full lap position.

The body of the triple valve is shown at 11, and has a flange 12 by means of which it is mounted on any suitably ported bracket (not shown). To such bracket all pipe connections are made, according to a practice well known in the art. The bracket would have a passage leading to the usual auxiliary reservoir and establishing communication with the slide valve chamber 13 by way of passages 14 in the retard stop bushing 15. The bracket would also have a passage communicating with brake cylinder passage 16 and connected with the brake cylinder and a passage communicating with the brake pipe passage 17 and connected with the brake pipe. A choke 18 is shown in the brake pipe passage 17 to intensify the effect of quick service venting on the triple piston and to limit the rate of brake pipe reduction.

The slide valve chamber 13 communicates directly with the triple cylinder 19 in which works the triple piston 21. The piston 21 is of ordinary form and controls a charging groove 22. The piston stem 23 is guided at its inner end by a spider 24, and between this spider and collar 25 a slide valve 26 is mounted. The slide valve works on a seat formed in chamber 13 and is allowed a limited amount of lost motion relatively to stem 23. On the top of slide valve 26 a seat is formed for the graduating valve 27 which is closely confined in a notch in stem 23. The slide and graduating valves are held seated by the usual bow springs, clearly shown in the drawings.

Normal recharge position is defined by a yielding retard stop 28 guided in bushing 15 and positioned by spring 29. Under heavy releasing pressures in the brake pipe, piston 23 moves inward, overpowering spring 29 and seating on rim 31 to reduce the charging rate to the capacity of slot 32.

A graduating stop 33 is guided in a bushing threaded into the front cap 34 and is sustained by graduating spring 35. If the spring be not overpowered the graduating stop 33 arrests piston 21 before it reaches full service position, and tends to return the piston to preliminary lap position and no farther.

Formed in the lower portion of body 13 is the cylinder 36 for quick service vent piston 37. This piston is guided by a stem 38 and makes a loose and leaky fit in cylinder 36. Lugs 39 prevent it from seating against the upper end of its cylinder while a bead 41 and gasket 42 ensure a tight seal at its lower limit of motion. A spring 43 normally retains the piston at its upper limit of motion.

An insert 44 serves to guide stem 38 support gasket 42 and spring 43. It includes a head which seats on gasket 45 and thus encloses the primary quick service chamber 46. Ports 47 and 48 connect chamber 46 with the cylinder space below piston 37 and a passage 49 connects chamber 46 with the secondary quick service chamber 51. Chamber 51 is formed as a cored space in body 11. A check or non-return valve 52 is interposed in passage 49. It opens to permit flow from primary chamber 46 to secondary chamber 51 and closes against reverse flow.

In addition to the two chambers 46 and 51 I prefer to use a third chamber 53 also formed as a cored space in body 11. This is really an extension or subdivision of chamber 51, being in constant communication therewith through a choke 54.

A passage 55 leads from brake pipe passage 17 through check valve 56 (which permits flow away from the brake pipe) to the space below the downward opening quick service valve 57. This valve is urged closed by coil compression spring 58 and may be forced open by piston 37 whose stem 38 is in thrust relation with valve 57.

When valve 57 is open air may flow from the brake pipe freely to chamber 46 and thence to chambers 51 and 53.

In the seat for slide valve 26 there are a port 61 which leads to the top of cylinder 36, a port 62 which leads to chamber 51, two ports 63 and 64 which lead to brake cylinder passage 16, a free atmospheric exhaust port 65 and an exhaust port 66 controlled by a retainer 67.

The slide valve 26 is ported as follows: a port 71 leads from the top to the bottom of the slide valve and registers with port 61 when the slide valve is in retarded release position. A port 72 leads from the top to the bottom of the slide valve and is elongated at the lower face of the valve, so as to communicate with port 61 in normal release, service and both lap positions, but not in retarded release position. A through port 73 leads from the top to the bottom of the slide valve and is elongated on the lower face thereof so as to register with port 65 in both release positions and with port 63 in both lap positions (also service position since the slide valve does not shift between service and lap). A service port 74 extends from the top to the bottom of the slide valve and registers with port 64 in service position (also both lap positions). At the upper end of port 74 is a restricted extension or tail port 75 controlled by the inner end of the graduating valve. An exhaust cavity 76 in the lower face of slide valve 26 connects ports 64 and 66 in normal release position and a restricted extension 77 leading from cavity 76 connects ports 64 and 66 for restricted flow in retarded release position. A cavity 78 in the lower face of the slide valve is connected with cavity 76 by passage 79. Cavity 76 registers with port 62 in both normal and retarded release positions.

The graduating valve 27 has a through port 81 which registers with port 72 in the slide valve when the graduating valve is in its outer (left hand) position relatively to the slide valve. Port 81 functions as the triple valve moves toward, and also after it reaches service position (Fig. 5). In the graduating valve 27 is a cavity 82 which connects ports 71 and 73 when the graduating valve is in its outer (left hand) position and connects ports 72 and 73 when the graduating valve is in its inner (right hand) position relatively to the slide valve. In its outer position it functions in normal recharge after retarded release (Fig. 4) to vent cylinder 36. In its inner position it functions in normal release position (Fig. 1) and full lap position (Fig. 7) to vent cylinder 36 to atmosphere and to the brake cylinder respectively.

*Operation*

*Normal release (Fig. 1).*—In this position charging occurs at normal rate. The brake cylinder is exhausted by way of ports 64, 76 and 66. Chambers 51 and 53 are vented by way of ports 62, 79, 76, 66. Since port 66 is controlled by the retainer, chambers 51 and 53 as well as the brake cylinder will be vented only to the retained value if retainer is set in retain position. Primary chamber 46 is vented through cylinder 36 past piston 37 and thence via ports 61, 72, 82, 73 and 65. Since port 65 leads directly to atmosphere the retainer does not affect the venting of primary chamber 46. This action takes place on all cars except those at the head of the train.

*Retarded release and recharge.*—In this position charging is limited to the capacity of slot 32 and release to the capacity of port 77. Chambers 51 and 53 are vented but at the restricted rate imposed by port 77. This action takes place only on cars at the head of the train.

*Normal recharge after retarded release (Fig. 4).*—When the retard stop restores the piston 21 and graduating valve 27 the slide valve 26 remains in position to retard release flow, while charging flow increases to the normal value. Cylinder 36 and primary chamber 46 are vented through ports 61, 71, 82, 73 and 65.

*Service (Fig. 5).*—A service reduction of brake pipe pressure first produces quick service venting. From normal release position, only the piston and graduating valve need move, but if the slide valve 26 has been moved to its release retarding position, it also must be moved. This stabilizes the triple valves on the head end of a train since these will have moved to retard the release.

Quick service venting occurs when port 81 in the graduating valve registers with port 72 in the slide valve, and port 72 registers with port 61. Then air from the auxiliary reservoir flows to cylinder 36 and forces piston 37 to its lowermost position where it seals on gasket 42 and holds valve 57 open. Brake pipe air from passage 17 flows through passage 55, and check valve 56, past valve 57 to chamber 46, thence past check 52 to chamber 51; and finally through choke 54 to chamber 53. Final equalization is delayed by choke 54, giving a gradual or cushioned termination of venting flow.

The choke 18 localizes the venting, ensuring full traverse of piston 21, bringing the valves 26 and 27 to the position of Fig. 5. In this position piston 37 is still subject to auxiliary reservoir pressure. Service port 74 is exposed by graduating valve 27 and registers with brake cylinder port 64.

*Preliminary lap (Fig. 6).*—Flow to the brake cylinder reduces auxiliary reservoir pressure, and as it approaches equalization with brake pipe pressure graduating spring 35 will shift the piston 21 and graduating valve 27 to preliminary lap position. Here action of the graduating spring ceases. Port 74 is closed except for tail port 75 which continues to afford restricted flow to the brake cylinder. Auxiliary reservoir pressure then slowly falls below equalization with the brake pipe, and the piston and graduating valve creep slowly to full lap position. In this way final lapping motion is decelerated and overtravel is prevented.

*Full lap (Fig. 7).*—In this position the graduating valve has completely lapped service port 74, 75, and cavity 82 connects ports 72 and 73, venting cylinder 36 and chamber 46 to the brake cylinder. This partially vents chamber 46 but not chambers 51 and 53 since valve 52 closes against back flow. The quick service mechanism is thus conditioned for a second venting action but at reduced capacity because chambers 51 and 53 remain charged. The vented air is usefully applied in the brake cylinder.

Although the quick service mechanism is conditioned to repeat its venting function (at a reduced capacity) there is no danger that the triple valve will creep into quick service position as the result of brake pipe leakage, for before quick service position is reached tail port 75 on the service port will open and permit auxiliary reservoir pressure to fall in consonance with brake pipe leakage.

*Effect of retainer.*—If retainers are set in retain position, the chambers 51 and 53 will be vented in release only to the retained pressure but the primary chamber 46 will be vented completely. On a subsequent reduction the venting is correspondingly reduced in the first reduction of a split reduction application.

The extension port 75 and its relation to the graduating valve and graduating stop, particularly as to preliminary lap position, also the quick service piston and valve, also some characteristics of venting the quick service measuring chamber particularly as to flow in lap position to the brake cylinder, also the use of choke 18, form the subject matter of my prior application Serial No. 593,635, filed February 17, 1932, and hence are claimed herein only in combination with the multiple quick service chamber arrangement which forms the principal subject matter of the present application.

What is claimed is,—

1. The combination of a triple valve provided with brake pipe and brake cylinder connections, said triple valve having service, lap and release positions; a pair of quick service chambers; means rendered effective by motion of the triple valve to service position for connecting both said chambers with the brake pipe connection; means effective in lap position of the triple valve to connect one of said chambers with the brake cylinder connection; and means effective in release position of the triple valve for venting both said chambers.

2. The combination of a triple valve provided with a brake pipe connection and a brake cylinder connection, said triple valve having service, lap and release positions; a pair of quick service chambers, the second of which has an auxiliary portion separated from the main portion of the chamber by a restricted communication; means rendered effective by motion of the triple valve to service position for connecting both said chambers with the brake pipe; means effective in lap position of the triple valve to connect the first of said chambers with the brake cylinder; and means effective in release position of the triple valve for venting both said chambers.

3. The combination of claim 2, further characterized in that a retainer is used to control exhaust from the brake cylinder and serves also to control the exhaust from said second chamber in release position of the triple valve.

4. The combination of a triple valve having a brake pipe connection and a brake cylinder connection, said triple valve having service, lap and release positions; a pair of quick service chambers in communication with each other; a non-return valve permitting flow through said communication from the first to the second of said chambers; means rendered effective by motion of the triple valve to service position to connect the first of said chambers with the brake pipe connection; means effective in lap position of the triple valve to connect said first chamber with the brake cylinder connection; and means effective in release position of the triple valve to vent both said chambers.

5. The combination of claim 4, further characterized in that a retainer is used and when operative controls the venting of the brake cylinder and the venting of the second of said chambers in release position of the triple valve.

6. The combination of a triple valve provided with a brake pipe connection and a brake cylinder connection, said triple valve having service, lap and release positions; a pair of quick service chambers in communication with each other; a non-return valve permitting flow through said communication from the first to the second of said chambers; a piston actuated quick service valve serving when open to connect the brake pipe with the first of said chambers; means effective as the triple valve moves to service position to admit pressure fluid against said piston to open said quick service valve; means effective in lap position to vent said first chamber at least partially; and means effective in release position of the triple valve to vent both of said chambers.

7. The combination of claim 6, further characterized in that one of said chambers has an auxiliary portion in restricted communication with the main portion thereof.

8. The combination of claim 6, further characterized in that the second of said chambers has an auxiliary portion in restricted communication with the main portion thereof.

9. The combination of claim 6, further characterized in that a retainer is used and when operative controls the venting of the brake cylinder and the venting of the second of said chambers when the triple valve is in release position.

10. The combination of a triple valve provided with a brake pipe connection and a brake cylinder connection, said triple valve having service, lap and release positions; a pair of quick service chambers in communication with each other; a non-return valve permitting flow through said communication from the first to the second of said chambers; a piston-actuated quick service valve serving when open to connect the brake pipe with the first of said chambers; means effective as the triple valve moves to service position to admit pressure fluid against said piston to open said quick service valve; means effective in lap position of the triple valve to connect said first chamber with the brake cylinder; and means effective in release position of the triple valve to vent both of said chambers.

11. In an automatic brake valve mechanism intended for connection with a brake pipe, brake cylinder, and auxiliary reservoir, the combination of a pair of quick service chambers in communication with each other; a non-return valve permitting flow through said communication from the first to the second of said chambers; a normally closed valve controlling flow from the brake pipe to the first of said chambers; a loosely fitted piston arranged to open said valve when subjected to pressure; means for sealing said piston at its limit of motion in valve opening direction; a triple valve provided with brake pipe and brake cylinder connections, said triple valve having a quick service position in which it admits pressure fluid against said piston, a lap position in which it vents to the brake cylinder connection the pressure fluid admitted against the piston in quick service position, and also pressure fluid from said first quick service chamber, the latter flowing past said loosely fitted piston; and a release position in which it vents both chambers.

12. The combination of claim 11, further characterized in that one of said chambers has an auxiliary portion in restricted communication with the main portion thereof.

13. The combination of claim 11, further characterized in that the second of said chambers has an auxiliary portion in restricted communication with the main portion thereof.

14. The combination of claim 11, further characterized in that a retainer is used and when operative controls the venting of the brake cylinder and the venting of the second of said chambers in release position of the triple valve.

15. In an automatic brake valve mechanism intended for connection with a brake pipe, brake cylinder, and auxiliary reservoir, the combination of a pair of quick service chambers in communication with each other; a non-return valve permitting flow through said communication from the first to the second of said chambers; a normally closed valve controlling flow from the brake pipe to the first of said chambers; a loosely fitted piston arranged to open said valve when subjected to pressure; means for sealing said piston at its limit of motion in valve opening direction; a triple valve provided with brake pipe and brake cylinder connections, said triple valve having a quick service position in which it admits pressure fluid against said piston, a lap position in which it vents to the brake cylinder connection the pressure fluid admitted against the piston in quick service position, and also pressure fluid from said first quick service chamber, the latter flowing past said loosely fitted piston; and a release position in which it vents both chambers, the first of said chambers being vented by flow past said loosely fitted piston and the second chamber being vented directly by ports in the triple valve.

16. The combination of claim 15, further characterized in that one of said chambers has an auxiliary portion in restricted communication with the main portion thereof.

17. The combination of claim 15, further characterized in that the second of said chambers has an auxiliary portion in restricted communication with the main portion thereof.

18. The combination of claim 15, further characterized in that a retainer is used and when operative controls the venting of the brake cylinder and the venting of the second of said chambers in release position of the triple valve.

19. The combination of claim 15, further characterized in that the second of said chambers has an auxiliary portion in restricted communication with the main portion thereof and that a retainer is used and when operative controls the venting of the brake cylinder and the venting of said second chamber in the release position of the triple valve.

In testimony whereof I have signed my name to this specification.

CHARLES A. CAMPBELL.